United States Patent [19]

Worsley et al.

[11] Patent Number: 5,043,417

[45] Date of Patent: Aug. 27, 1991

[54] LOW MOLECULAR WEIGHT UREA-FORMALDEHYDE REACTION PRODUCTS AND PROCESS FOR THE PREPARATION THEREOF

[76] Inventors: Michael Worsley; Kenneth M. Worsley, both of 7624 - 132 Avenue, Edmonton, Alberta, Canada, T5C 2B1

[21] Appl. No.: 258,902

[22] Filed: Oct. 17, 1988

[51] Int. Cl.$^5$ .................. G08G 12/12; C05C 9/00
[52] U.S. Cl. .................. 528/259; 528/260; 71/28; 71/30
[58] Field of Search .............. 528/259, 260; 71/28, 71/30

[56] References Cited

U.S. PATENT DOCUMENTS 2,278,375  3/1942  Olin .................. 528/260
2,644,806  7/1953  Kise .................. 528/259
3,759,687  9/1973  Nobell .................. 528/259
4,596,593  6/1986  Tazawa et al. .
4,879,410  11/1989  Singh et al. .................. 548/537

Primary Examiner—John Kight, III
Assistant Examiner—Kathryne E. Shelborne
Attorney, Agent, or Firm—E. Peter Johnson

[57] ABSTRACT

Low molecular weight urea-formaldehyde reaction products are provided. Such products exhibit cold water solubility. They find use as a sustained nitrogen-release source for animals and plants. A three-stage process is provided for preparing the reaction products. The first stage comprises reacting urea and formaldehyde in an alkaline, alcoholic solution. Then the solvent is distilled off to form a melt. In the final stage the melt is polymerized to form the cold water soluble, low molecular weight reaction product.

3 Claims, 1 Drawing Sheet

LOW MOLECULAR WEIGHT UREA-FORMALDEHYDE REACTION PRODUCTS AND PROCESS FOR THE PREPARATION THEREOF

FIELD OF THE INVENTION

The present invention relates to a ureaformaldehyde reaction product for use as a sustained nitrogen-release source and to a process for the preparation thereof.

BACKGROUND OF THE INVENTION

Ammonia-based fertilizers have long been utilized as means for augmenting the nitrogen availability within the nitrogen cycle. Deleteriously, however, bacterial oxidation of the ammonia therein converts it initially to nitrite and then to nitrate before it can be utilized by the plants. As is well known in the art, nitrites are toxic. The nitrates are usually lost as a nitrogen source by leaching out and ultimate reduction to nitrogen.

In order to eliminate such nitrification processes, urea has long been used as a slow, or sustained, nitrogen-release source. However, the enzyme urease is present in the soil. Urease is functional to convert urea to ammonia extremely rapidly.

Similarly, urea has been utilized as an ammonium source for ruminants. But, urease is also present in the rumen of such animals. Rapid release of ammonia within the rumen will cause the animal undue distress, and therefore is not desirable.

In order to circumvent the problems associated with urea the prior art processes have provided various condensation products of the reaction between urea and formaldehyde (hereinafter referred to as the ureaformaldehyde reaction).

The reaction of urea with formaldehyde and the resultant products are well documented.

The reaction products will vary depending upon the reaction conditions. Under basic conditions the yield of methylol compounds predominates. Under acidic conditions, methylene-bonded compounds are produced.

U.S. Pat. No. 3,759,687, issued to A. Nobell, and U.S. Pat. No. 2,644,806, issued to M. A. Kise, exemplify the prior art teachings on the urea-formaldehyde reaction undertaken in aqueous solution and the properties of the condensation products thereof.

It will be readily appreciated that such condensation products comprise urea-formaldehyde polymers having high molecular weights. The control of the degree of polymerization however, is difficult using these prior art processes. Typically, the polymer chains may comprise from 4 to 7 urea units. It is undesirable to have such high molecular weight polymers because bacteria have difficulty in breaking down polymer chains which contain more than 4 or 5 urea units therein. Additionally, such compositions exhibit solubility only in hot water. Therefore, when these prior art compositions are utilized as, for example, fertilizers, in order to be effective they must be ploughed into the ground.

There exists, therefore the need for a sustained nitrogen-release urea-formaldehyde product possessing the following characteristics:
 low molecular weight polymer chains preferably containing no more than four urea units; and
 cold water solubility whereby the need for ploughing the product in would be eliminated as the product would go into solution readily in rain water or the like;
and for a process characterized by the following:
simplicity;
inexpensiveness; and
imparting a degree of controllability to the polymerization process.

SUMMARY OF THE INVENTION

Figure 1:
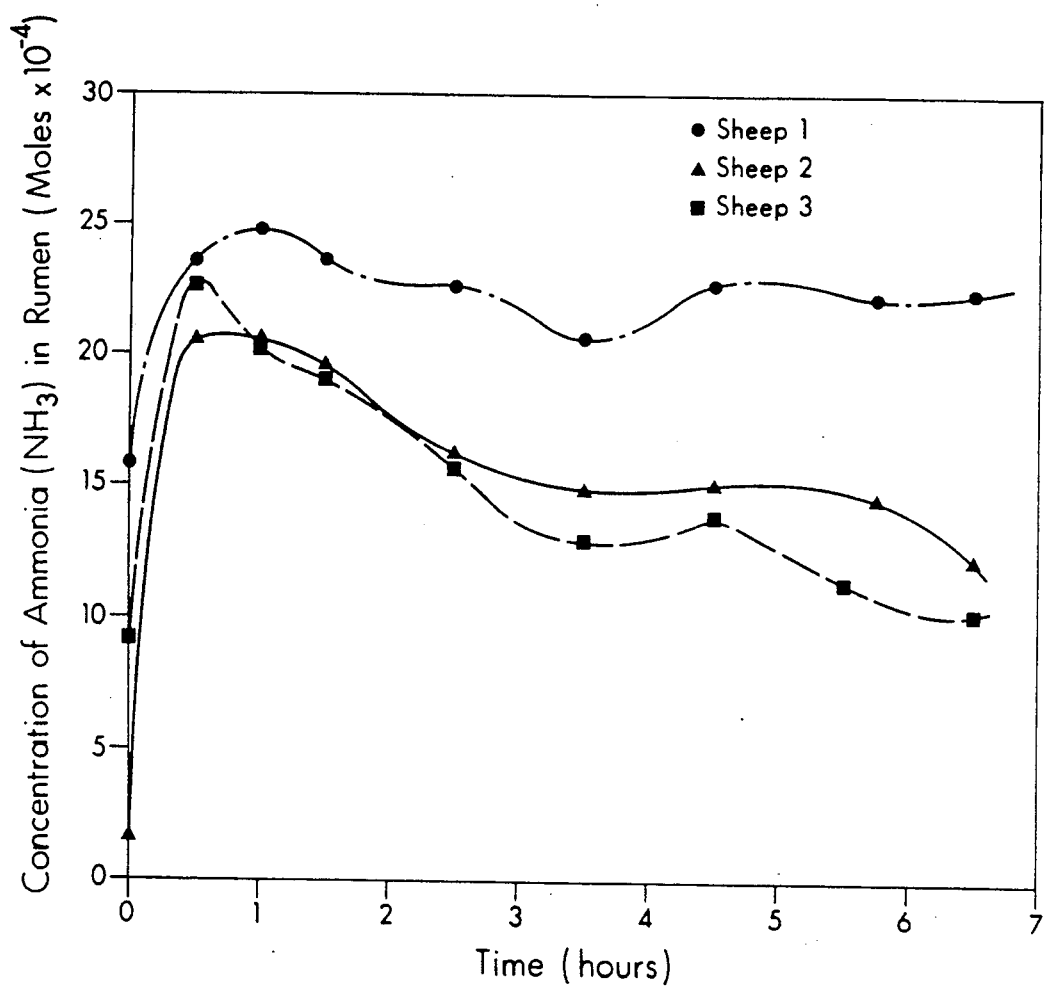
FIG. 1 is a plot of the concentration of ammonia in the rumen of sheep verses time which is included to demonstrate the slow release properties of the products of the present invention.

In accordance with the present invention it has been discovered that if the reaction between urea and formaldehyde is conducted under alkaline conditions (preferably utilizing either NaOH or KOH) in an alcohol (specifically ethanol or methanol) it is possible, within limits, to control the degree of polymerization, and thereby provide low molecular weight reaction products which are substantially cold water soluble. By cold water soluble is meant soluble at 20° C.

Advantageously, by utilizing either of said alcohols as the reaction media it is possible to recover substantially all the alcohol for recycling. Additionally, the reaction is conducted at a lower temperature than in the aqueous reactions, with concomitant reduction in heating costs.

Broadly stated, the invention is a urea-formaldehyde reaction product for use as a sustained nitrogen-release source comprising: urea in the range of between about 25-35 percent by weight; diureaformaldehyde in the range of between about 30-40 percent by weight; tri-ureaformaldehyde in the range of between about 10-14 percent by weight; and cold water insoluble urea formaldehyde resin in the range of between about 18-25 percent by weight.

Another broad aspect of the invention is a process for preparing a urea-formaldehyde product for use as a sustained nitrogen-release source, comprising the steps of: (a) reacting urea and gaseous formaldehyde or paraformaldehyde in an alkaline non-aqueous solution of methanol or ethanol with heat, the molar ratio of urea to formaldehyde or paraformaldehyde being in the range of between about 2.1:1–3:1; (b) distilling off the methanol or ethanol solvent to thereby yield a low melting point solid; (c) heating the product of step (b) until solidification thereof takes place; and (d) further heating the product of step (c) to remove the water of reaction to thereby yield a urea-formaldehyde reaction product comprising urea, diureaformaldehyde, tri-ureaformaldehyde and cold water insoluble urea formaldehyde resin.

DESCRIPTION OF THE PREFERRED EMBODIMENT

The invention involves a three-stage process. The process is defined by the following reactions:

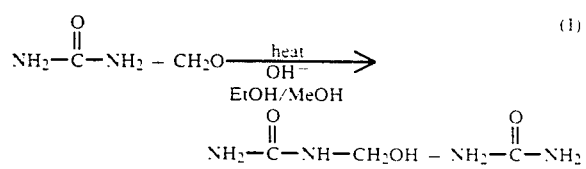

-continued

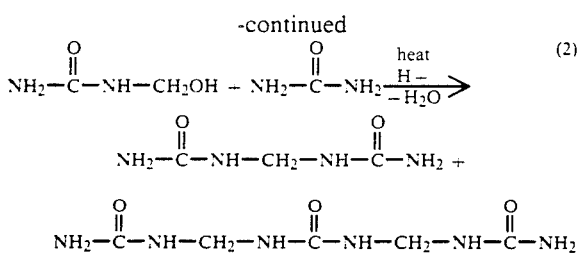

In the first stage of the process urea and gaseous formaldehyde or paraformaldehyde are reacted in a non-aqueous, alkaline, alcoholic solution to form methylol urea and urea as outlined in reaction 1 supra.

The reactants are of commercial grade. The ratio of urea to formaldehyde or paraformaldehyde is critical to ensure formation of the desired reaction products. The ratio of urea to formaldehyde (or paraformaldehyde) should be in the range of between 2.1:1 to about 3:1 because the product would be insoluble at less than 2 to 1.

The alcohol utilized in the process must be ethanol or methanol. The concentration of alcohol would be 4 mls of alcohol to each gm of urea.

The base is utilized as a reaction catalyst. The base can be selected from either sodium hydroxide or potassium hydroxide. The concentration of the hydroxide should be in the range of about 0.5% or sufficient to adjust the alcohol solution pH to between about 10–12 and maintain the alkalinity of the solution until the last stage of the process. In the absence of the base the reaction produces, undesirably, large amounts of hot water insoluble adducts.

The reaction is conducted at the temperature of the boiling point of the particular alcohol solvent.

The reaction of the first stage is carried out as follows.

The urea is first added to the alcohol solution made alkaline by addition of the hydroxide thereto. The formaldehyde or paraformaldehyde is added gradually with heating until reaching the boiling point of the alcohol. The amount of alcohol utilized is sufficient to permit the solvation of the urea at this temperature. The urea gradually dissolves as the methylol groups are formed. Upon addition of all the para or formaldehyde at the solvent boiling point all the urea should be in solution.

The first stage reaction yields approximately 50 percent methylol urea and slightly more than 50 percent urea.

The second stage of the process comprises distilling off the alcohol, leaving a low melting point solid in the form of a melt. Vacuum may optionally be used to remove the alcohol. The temperature is controlled to leave the solid as a melt. It will be noted that by recovering the alcohol being evaporated off, it may be recycled.

The third stage of the process involves raising the melt to an elevated temperature and adding an acid or acid-producing substance thereto, to form the di-ureaformaldehyde and higher molecular weight polymer chain compounds. The formed solid is heated further to drive off the water of reaction.

Specifically, the melt from the second stage is heated to a temperature of about 110° C. This temperature is selected to ensure fluidity of the melt and a rapid reaction with the acid. It will be noted that if the temperature is increased the content of hot water insoluble urea formaldehyde resin formed will deleteriously increase concomitantly.

An acid or acid-releasing substance is added to the melt with rapid stirring. The addition of the former initiates the reaction of the methylol groups with the excess unreacted urea. The acid may be a mineral acid, for example hydrochloric. Alternatively, an organic acid, for example, glacial acetic acid or an acid-releasing substance such as ammonium chloride may be utilized. The amount of acid should be sufficient to neutralize the base. The amount of acid utilized has been found to accelerate the rate of polymerization to the final product. However, the reaction will take place, albeit less rapidly without the addition of an acid-releasing substance. For example, with addition 1 gm. of ammonium chloride to 100 gm urea at 110° C., solidification will take place within five minutes.

The formed solid is then heated to a temperature of 130° C. to drive off the water of reaction and produce the final product.

EXAMPLE I 100 gm of urea were added to a solution containing 400 ml methanol and 1 ml of concentrated potassium hydroxide. 23.8 gm of paraformaldehyde were added with heating until the boiling point of methanol, 65° C., was reached. Boiling was continued until all of the urea went into solution. The solvent was then evaporated leaving a melt. The melt was heated to 110° C. for a period of approximately 2 minutes and 1 gm of ammonium chloride in 3 ml of water was added with rapid stirring. Upon solidification, the solid was heated to 130° C. to drive off the water of the reaction.

Analysis of the solid showed the nitrogen content was as follows:

% N=42.3.

Results 25 gm of the solid were ground and added to 500 ml water. The solution was heated to boiling, filtered and the solid dried and weighed. The solution was cooled to room temperature and filtered. The solid product was dried and weighed.

The solid product was tested to determine its solubility.

% solubility in hot water=90
% solubility in cold water=79.

EXAMPLE II 100 gm of urea were added to a solution containing 400 ml ethanol and 1 ml of concentrated potassium hydroxide. 22.2 gm of paraformaldehyde were added slowly with heating until the boiling point of ethanol (78.3° C.) was achieved. The solution was heated until all the urea went into solution. The solvent was evaporated, leaving a melt. The melt was heated to 110° C. for about 2 minutes and 1 ml of glacial acetic acid was added with rapid stirring. Upon solidification, the product solid was heated to 130° C. to drive off the water of the reaction.

Analysis of the solid showed the nitrogen content was as follows:

% N=42.6.

Results 25 gm of the solid were ground and added to 500 ml water. The solution was heated to boiling and filtered. The solid was dried and weighed. The solution was cooled to room temperature and filtered. The solid was dried and weighed.

The solid product was tested to determine its solubility:

% solubility in hot water = 92
% solubility in cold water = 82.

EXAMPLE III

The following table presented herebelow provides characterization data of the urea-formaldehyde reaction products produced in accordance with the process of the invention. An analysis of a commercial product prepared by a urea-formaldehyde reaction process which was carried out using aqueous conditions is provided for comparison purposes.

As well, theoretical values calculated from statistical distribution at the 2.1:1 urea to formaldehyde ratio are indicated.

All constituent values are given as percent of total nitrogen.

| Ratio of Reactants | | Urea | MDU | DMTU | CWIN |
|---|---|---|---|---|---|
| 2.1:1 UF | Theoretical | 28 | 25 | 19 | 28 |
| | Commercial Product | 27 | 25 | 14.6 | 29.5 |
| | Invention Product | 26.7 | 39.7 | 12.2 | 21.4 |
| 2.25:1 UF | Commercial Product | 34 | 25 | 10.6 | 24.5 |
| | Invention | 32.4 | 34.7 | 11.5 | 21.4 | where
UF is parts of urea to formaldehyde
MDU is diureaformaldehyde
DMTU is triureaformaldehyde
CWIN is cold water insolubles The embodiments of the invention in which an exclusive property or privilege is claimed are defined as follows:

1. A process for preparing a urea-formaldehyde condensation reaction product for use as a sustained nitrogen-release source comprising the steps of:
   (a) reacting urea and at least one of gaseous formaldehyde and solid paraformaldehyde in an alkaline solution of methanol or ethanol with heat, said molar ratio of urea to formaldehyde or paraformaldehyde being in the range of between 2.1:1–3:1;
   (b) distilling off the methanol or ethanol solvent to thereby yield a low melting point mixture in molten form;
   (c) adding an acid or acid-producing substance to the melt and heating the mixture to a temperature in the range of about 110° C. until solidification thereof takes place; and
   (d) further heating the product of step (c) to remove the water of reaction to thereby yield a urea-formaldehyde reaction product comprising urea, diureaformaldehyde, triureaformaldehyde and cold water insoluble urea-formaldehyde resin.

2. The process as set forth in claim 1 wherein said alkali used to prepare the alkaline solution of methanol or ethanol comprises sodium hydroxide or potassium hydroxide.

3. The process as set forth in claim 1 wherein:
   the pH in step (a) is maintained in the range 10–12 and the reaction is conducted at a temperature substantially equal to the boiling point of alcohol.

* * * * *